July 6, 1965
W. B. NOLAND
3,192,546
SELF LOCKING DOCK PLATE
Filed Sept. 7, 1961
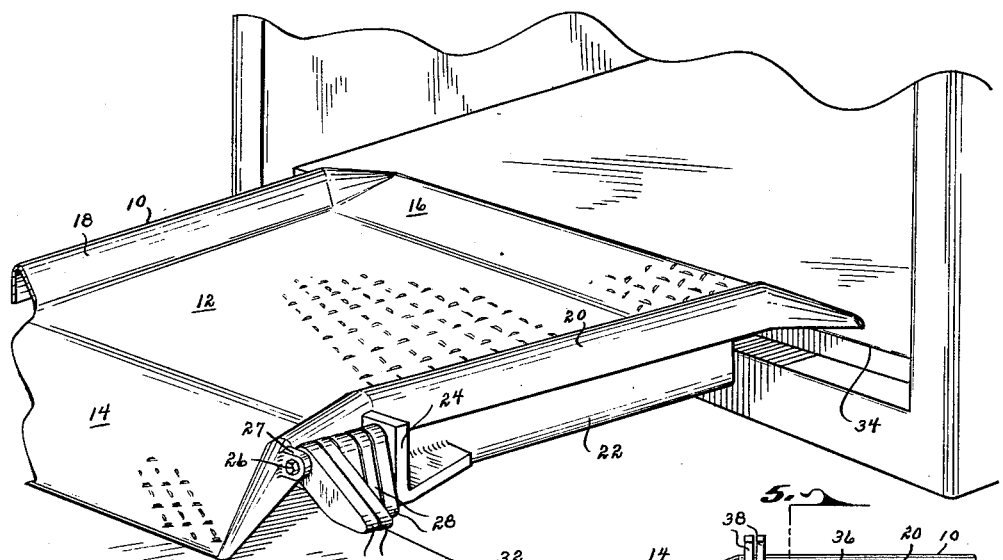
Fig. 1
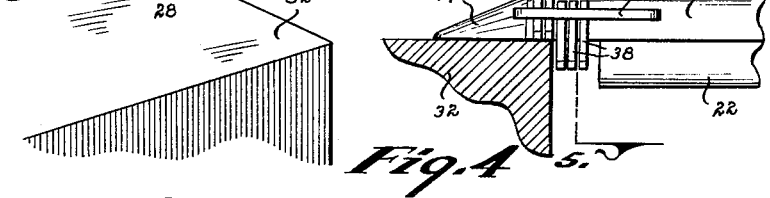
Fig. 2
Fig. 4
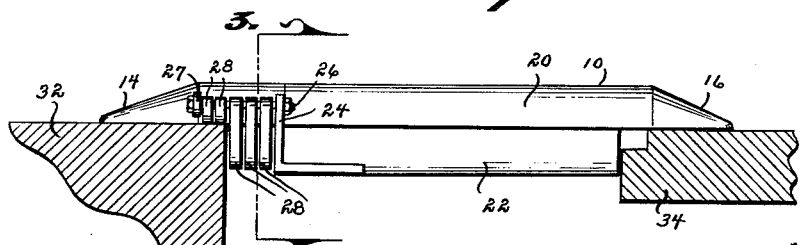
Fig. 5
Fig. 3
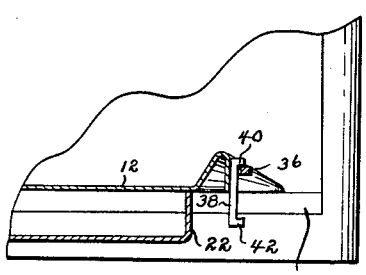
INVENTOR.
WAYNE B. NOLAND
BY Talbert Dick & Darley
ATTORNEYS
WITNESS
NORMAN G. TRAVISS

United States Patent Office 3,192,546
Patented July 6, 1965

3,192,546
SELF LOCKING DOCK PLATE
Wayne B. Noland, Avon Lake, Iowa, assignor to Woodford Manufacturing Company, Des Moines, Iowa, a corporation of Iowa
Filed Sept. 7, 1961, Ser. No. 136,659
3 Claims. (Cl. 14—72)

This invention relates to dock plates and more particularly to a dock plate which automatically locks itself against longitudinal movement while in use.

Dock plates over which loads are moved from a loading dock to a carrier means, such as a truck, or the like, or from truck to dock, are old and well known in the art. Theretofore, however, such dock plates have suffered from a plurality of dangerous and undesirable drawbacks.

One of the principle drawbacks inherent to dock plates heretofore known in the art is the slipping out of position of the dock plate at the moment a load is attempted to be moved thereonto. Not only has this drawback been the cause of many accidents involving personal injury, but considerable damage to merchandise as well.

Several attempts at locking dock plates in place have been made, but they are all of the manually operated type and are unwieldy in operation. Further, workmen forget to use the locking means and thus such devices are unsatisfactory from a safety standpoint.

Another drawback to previous dock plates is that they tend to buckle and fold as a particularly heavy load is moved thereacross. This drawback also is a frequent source of personal and property damages.

Therefore, one of the principal objects of this invention is to provide a dock plate which will lock into place automatically.

Another object of this invention is to provide a locking means of a dock plate which is automatically adjustable for varying distances between the truck and dock.

Still another object of this invention is to provide a dock plate which will not buckle or fold even when extremely heavy loads are moved thereacross.

A still further object of this invention is to provide a self locking dock plate that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my dock plate in use.
FIG. 2 is a reduced side view of my dock plate in use.
FIG. 3 is a cross-sectional view of the locking mechanism of the dock plate taken on line 3—3 of FIG. 2.
FIG. 4 is a side view of a modified form of locking mechanism, and
FIG. 5 is a cross-sectional view of the locking mechanism of FIG. 4 and is taken on line 5—5 of that figure.

In the drawings, the numeral 10 generally designates my dock plate. The numeral 12 generally designates the floor platform of the dock plate 10. The platform 12 is preferably constructed of heavy gauge sheet metal, and is rectangular in surface area. The end portions 14 and 16 of the platform 12 extend respectively downwardly and outwardly from each end of the central portion 12 as shown in FIG. 1. The top surface area of the platform 12 may be matted to provide a non-slip surface and safer footing.

In the preferred embodiment of the invention, each side of the platform 10 has a raised rib. As particularly shown in FIG. 3, the ribs may be an integral part of the platform. These raised ribs, 18 and 20, perform two purposes; first, the ribs act as side rails which keep the load being moved across the platform 12 from being accidentally pushed off one of the sides of the platform 12, thus increasing the safety of the dock plate. Secondly, the ribs 18 and 20 add considerably to the structural strength of the platform 12, thus increasing its load efficiency.

The box understructure 22 occupies the area of and is secured to the central portion of the bottom surface of the platform 12. The box understructure 22 extends substantially vertically downwardly from the plane of the central portion of the platform 12 and is terminated in a plane in spaced parallel relation to and below the plane formed by the outer edges of the downwardly and outwardly extending end portions 14 and 16 of the platform 12, best shown in FIG. 1 and FIG. 2.

A bracket is secured to at least one vertical side of the box understructure 22 and near one of its ends. Secured to the bracket 24 and extending horizontally therefrom and substantially to one end of the approaches such as 14 is in the pivot rod 26. The pivot rod 26 is disposed in substantially spaced parallel relation to the side edges of the central portion of the platform 12 and extends through the longitudinally transverse aperture in bracket 27 secured to the side of the approach 14. The numeral 28 designates a plurality of bar arms, each having its upper end rotatably embracing the rod shaft 26. These pivot bar arms 28 are yieldingly held in a downwardly extending direction by the force of gravity, and normally terminate below the outer end edges of the downwardly and outwardly extending end portions 14 and 16 of the platform 12, as shown in FIG. 2. The bottom ends of the pivot arms are suitably elliptically rounded so as to allow them to be moved relatively upwardly and out of the way by the top surface of either loading dock 32 or the carrier bed 34 as the dock plate 10 is lowered into position therebetween, as shown in the drawings.

A set of these bar arms may be mounted on both sides of the dock plate and may be adjacent either the approach wing 14 or the approach wing 16.

In operation, as the dock plate 10 is lowered into communicating position between the loading dock 32 and the bed of the carrier 34, with the approach wing portions 14 and 16 overlying the top surface of the dock and truck as shown in FIGS. 1 and 2. The end of the box understructure 22 will abut against the vertical end surface of either the loading dock 32 or the carrier, depending which way the dock plate 10 is turned. As the dock plate 10 is thus being lowered into position, the pivot bar arms, located at the opposite end of the structure from the above-mentioned end of the box understructure 22, which overlie the top surface of either the loading dock 32 or the bed of the carrier 34 (again depending upon which way the dock plate 10 is turned) are pushed upwardly and outwardly out of the way but the remaining pivot arms stay in their downwardly extending position; thus automatically adjustably securely locking the dock plate in position by successfully filling with the box structure 22 the gap between the vertical end of the dock and the vertical end of the carrier. Thus, the downward swing movement of sufficient bar arms to complete the filling of the gap will be automatic and when so automatically accomplished, the dock plate will be prevented thereby from longitudinal sliding movement relative to the dock and truck.

In FIG. 4 and FIG. 5, I show a modified form of automatically filling the gap between the vertical ends of the dock and truck. The operation is identical and the only difference is to have a plurality of vertically slidable stop bars arranged in a row longitudinally of the dock plate and at one end of the understructure 22. To accomplish this I have a horizontal retaining rail 36 on one side of the dock plate. A passageway is defined between the dock plate side and the rail 36. A row of stop bars 38 are vertically slidable in the passageway and each is capable of independent limited vertical slidable movement. Each bar has a stop retaining head 40 and a stop foot 42. In the same manner as the stop bar arms 28, the stop bars 38 will automatically fall downwardly in sufficient number to fill, with the structure 22, the gap between the dock and end of the carrier.

Some changes may be made in the construction and arrangement of my self locking dock plate without departing from the real spirit and purpose of my invention, and it is my intention to cover by my claims, any modified forms of structure or use of mechanical equivalents which may be reasonably included within their scope.

I claim:

1. An elongated dock plate having approach ends adapted to bridge spaced supporting structures, a fixed stop extending below said dock plate and inwardly of one approach end, retaining means for movable stops adjacent the opposite approach end of said dock plate and extending longitudinally thereof, a plurality of adjacent movable stops carried by said retaining means throughout the length of said retaining means, said stop means being movable by force of gravity relative to said retaining means below said dock plate whereby when said fixed stop engages one supporting structure certain of the movable stops will be automatically raised out of operative position by contact with the top surface of said other supporting structure leaving the remaining movable stops in a lowered position to engage the end of said other supporting structure.

2. The structure of claim 1 wherein said retaining means is a rod and said stop means are arms pivoted at one end thereof to said rod.

3. The structure of claim 2 wherein said retaining means cooperates with means on said dock plate to define a passageway, and said stop means are further defined as being elongated bars vertically slidable in said passageway.

References Cited by the Examiner

UNITED STATES PATENTS

| 556,169 | 3/96 | Tilghman | 143—168 |
|---|---|---|---|
| 615,991 | 12/98 | Ingman | 143—168 |
| 1,821,734 | 9/31 | Viche | 14—72 |
| 2,452,222 | 10/48 | Bryson | 14—72 |

JACOB L. NACKENOFF, *Primary Examiner.*

UNITED STATES PATENT OFFICE
CERTIFICATE OF CORRECTION

Patent No. 3,192,546                          July 6, 1965

Wayne B. Noland

It is certified that error appears in the above identified patent and that said Letters Patent are hereby corrected as shown below:

Column 4, line 11, the claim reference numeral "2" should read -- 1 --.

Signed and sealed this 15th day of December 1970.

(SEAL)
Attest:

Edward M. Fletcher, Jr.
Attesting Officer

WILLIAM E. SCHUYLER, JR.
Commissioner of Patents